United States Patent [19]

Kyster et al.

[11] Patent Number: 4,940,538
[45] Date of Patent: Jul. 10, 1990

[54] APPARATUS FOR DECALCIFYING WATER BY PRODUCING TURBULENCE

[75] Inventors: Erik Kyster, Sonderborg; Niels-Henrik G. Jakobsen; Jens J. Molbaek, both of Nordborg; Ole Stenderup, Sonderborg; Bjarne Straede, Sonderborg, all of Denmark

[73] Assignee: Danfoss A/S, Nordborg, Denmark

[21] Appl. No.: 312,679

[22] Filed: Feb. 21, 1989

[30] Foreign Application Priority Data

Mar. 10, 1988 [DE] Fed. Rep. of Germany ...... 3807876

[51] Int. Cl.$^5$ ............................................... C02F 5/02
[52] U.S. Cl. ..................................... 210/137; 210/206; 210/209; 204/197; 137/503; 138/45; 138/DIG. 6
[58] Field of Search ............... 204/149, 150, 197, 152; 210/198.1, 206, 209, 137; 137/503, 543.15; 138/41, 45, 46, 146, DIG. 6

[56] References Cited

U.S. PATENT DOCUMENTS

| | | | |
|---|---|---|---|
| 3,686,092 | 8/1972 | Stehlin | 204/150 |
| 3,835,015 | 9/1974 | Gary | 204/197 |
| 3,919,068 | 11/1975 | Gary | 204/197 |
| 4,172,465 | 10/1979 | Dashnen | 137/543.15 |
| 4,606,828 | 8/1986 | Wells | 210/198.1 |
| 4,781,805 | 11/1988 | Dahlgrer | 204/149 |

Primary Examiner—W. Gary Jones
Assistant Examiner—Matthew O. Savage
Attorney, Agent, or Firm—Wayne B. Easton; Clayton R. Johnson

[57] ABSTRACT

An inlet nipple and a housing having a water passage extending therethrough that have first, second and third water bore portions of progressively larger diameters in a downstream direction. A variable throttle point is formed by a fixed member and a movable member acting in conjunction with the bore portions that produce a turbulent flow causing cavitation downstream of the throttle point independently of the quantity of flow. In one embodiment the movable member includes a closure portion seatable against a seat formed at the intersection of the bore portion and an annular portion that in conjunction with a bore portion forms an annular water flow space downstream of the closure portion. In the second embodiment the fixed member has a closure portion converging toward an aperture in the movable member which is in the shape of a cup. A filter insert is secured to the housing to collect precipitated material while a layer of galvanically soluble metal is provided on the movable member to have water flow thereover.

10 Claims, 1 Drawing Sheet

APPARATUS FOR DECALCIFING WATER BY PRODUCING TURBULENCE

The invention relates to an apparatus for decalcifing water by producing turbulence.

In a known apparatus of this kind U.S. Pat. No. 3,919,068, an insert in a pipe circuit has a substantially triangular cross-section to produce three flow passages. These contain transverse ribs which produce turbulence. The insert consists of an alloy of tin, copper, zinc and nickel. This apparatus is intended to divide out calcium carbonate. However, its effectiveness is limited because precipitation of the calcium carbonate occurs only at high flow velocities, that is to say high quantities of flow.

The invention is based on the object of providing a decalcifing apparatus of the aforementioned kind that is effective over the entire operating range for the quantity of flow.

This problem is solved according to the invention by a variable throttle point which, under the influence of the quantity of flow and a counter-force, assumes such a position that turbulent flow causing cavitation is produced behind the throttle point independently of the quantity of flow.

The variable throttle point ensures that even with small flow quantities one obtains such turbulent flow as is known to be necessary in order to be effective. The cross-section of the throttle passage is reduced in the case of small flow quantities until the resultant velocity necessarily leads to turbulence causing cavitation. These cavitation effects support the separation of the calcium hydrocarbonate contained in the water into the calcium carbonate which is to be precipitated and carbon dioxide. The cavitation is produced on hydrophobic agents, that is to say particles which are insoluble in water, and on the bounding walls. It causes energy to be supplied which permits the decomposition of the calcium hydrocarbonate even without the supply of heat. The calcium carbonate is deposited on particles in the water which are either there naturally or which were dissolved from the walls by erosion associated with the cavitation. As a result of the turbulence, these particles continually make contact with the calcium carbonate so that the deposits form larger particles which can be separated out without difficulty.

Advantageously, the quantity-opening characteristic of the throttle point is selected so that the Reynolds' number of the turbulent flow is larger than 50,000. Operation with such high Reynolds' numbers leads to an energetically turbulent flow with intensive cavitation.

It is also favourable if the quantity-opening characteristic of the throttle point is selected so that the Reynolds' number of the turbulent flow is substantially constant over the entire operating range. Under these conditions, the rate of precipitation is likewise substantially constant over the entire operating range.

In one embodiment, the throttle point has a fixed and a movable portion which is spring biased. The spring acts as a counter-force. The quantity-opening characteristic of the throttle point can be determined with the aid of the spring characteristic.

In another alternative, the throttle point has a fixed and a movable portion of which the downstream pressure face is larger than the upstream pressure face. The difference in area in conjunction with the pressure drop at the throttle point leads to a counter-force which determines the quantity-opening characteristic of the throttle point.

Advantageously, the throttle point has a variable annular gap which is bounded by a fixed portion and an axially movable portion. This annular gap has a narrow width in comparison with a relatively long length. This results in turbulent flow with an annular cross-section leading to intensive eddying behind the throttle point.

From a constructional point of view, it is possible that the throttle point be formed by a fixed seat and a closure member which is displaceable in the outlet direction of the seat and converges towards the seat. This results in a very simple construction.

The closure member can in this case be displaceable on a guide rod which is fixed with respect to the housing in front of and behind the seat. The guide rod ensures that, in the case of an annular gap, the width of the gap is constant right around in every open position.

Further, the closure member may be continued in a cylindrical wall which receives a spring, particularly a helical spring. An annular gap is formed between the wall and the housing in which the turbulent flow enters from the throttle point.

A different constructional possibility is where the throttle point is formed by a movable apertured plate and a fixed closure member which converges towards the aperture Here, again, the throttle point consists of a variable annular gap.

In particular, the apertured plate may form the base of a cup which has an outer rim at the open end and is disposed in a housing enlarged by a step. On both sides of the step, a diaphragm is fixed to the housing, one of the diaphragms being connected to the base and the other to the outer rim. The diaphragms enclose a pressure relief chamber between each other. This construction is likewise simple to bring about.

Further, it is favourable for a supply of galvanically soluble metal to be inserted This improves the crystal growth of the calcium carbonate that is to be precipitated. Nickel and zinc, iron and cobalt are particularly suitable for this purpose.

Further, the wall of the movable portion facing the flow may carry behind the throttle point a layer of galvanically soluble metal. At this position, the effect on the precipitation is particularly large.

In addition, the gradual corrosion of this layer does not interfere with the operation of the throttle point.

In a preferred embodiment, the cylindrical wall on the closure member is provided with the layer of galvanically soluble material. In this case, a large area is available for contact with the flow and the layer.

A filter behind the throttle point is recommended. The precipitated calcium carbonate can be immediately held back in the filter.

In particular, the throttle point and the filter can be carried by a common housing. One therefore obtains a simple unit which can be built in for decalcification purposes.

Preferred examples of the invention will now be described in more detail with reference to the drawing, wherein.

Figure 1:
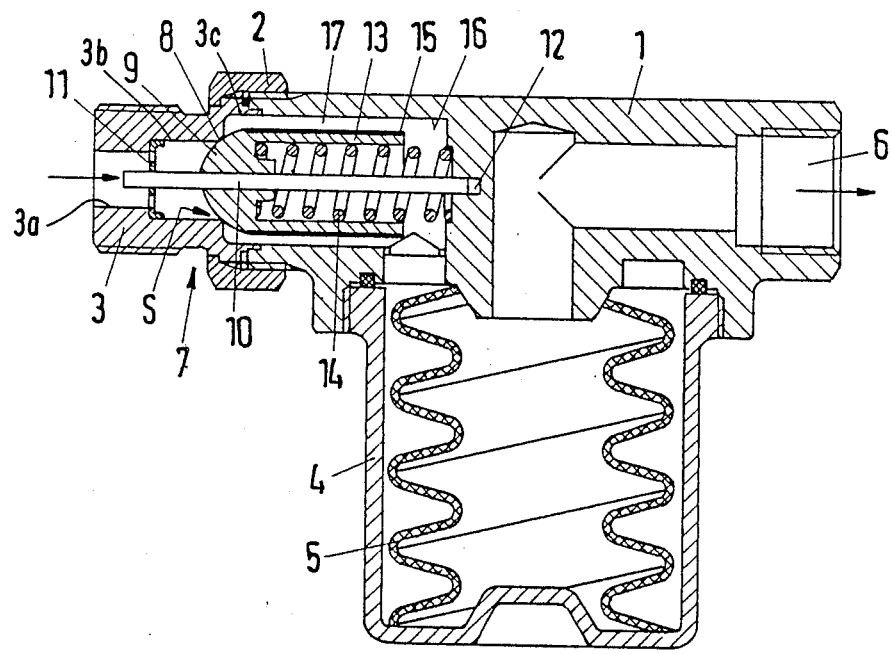
FIG. 1 is a longitudinal section through a first embodiment.

By means of a cap nut 2, an inlet nipple 3 is applied to a housing 1. The nipple has first, second and third bore portions 3a, 3b and 3c respectively with the second bore portion being axially between the first and third bore portions, and the bore portions being progressively larger in a downstream direction. A filter insert 4 having a filter 5 is screwed in from below. An outlet nipple 6 is formed in the housing 1.

A variable throttle point 7 is formed by a seat 8 at the inlet nipple 3 and a closure member 9 which converges towards the seat and has a shape intermediate a cone and a hemisphere. In operation, an annular gap S of variable size is formed between these parts. The closure member 9 is displaceable on a guide rod 10 which is held by an apertured retaining plate 11 at the inlet nipple 3 and a bore 12 of the housing 1. Adjoining the closure member 9 there is a wall 13 which encloses a helical spring 14 pressing the closure member 9 against the seat 8. On the outside of the wall there is a layer 15 consisting of a galvanically soluble metal. When using a housing 1 of steel, this layer is of nickel and/or zinc. The cylindrical wall 13 together with a cylindrical bore 16 of the housing 1 forms a passage 17 of annular cross-section. The latter is downstream of the variable throttle point 7.

When in operation water is supplied through the inlet nipple 3, the water pressure displaces the closure member 9 in the opening direction against the force of spring 14. By reason of the spring characteristic and the shape of the closure member 9, each quantity of flow corresponds to a very particular cross-section of the annular gap S. It is dimensioned so that, adjoining the variable throttle point 7, that is to say at least at the beginning of the passage 17, there will be turbulent flow which produces cavitation. This condition obtains over the entire operating range, i.e. from very small to very large quantities of flow. The Reynolds' number is substantially constant.

In operation, calcium carbonate is accumulated at the outside of the filter 5, usually in the form of needle-shaped aragonite crystals. It is assumed that separation of the calcium hydrocarbonate into calcium carbonate and carbon dioxide that normally only takes place upon heating is supported by the energy supplied through turbulence and particularly by cavitation energy. The turbulence causes the number of collisions between the resulting calcium carbonate ions and the crystals formed therefrom to be increased until they are finally large enough to be precipitated or retained in the filter. The disolved zinc and nickel molecules enhance the formation of crystals. It is not necessary to apply a voltage because the steel of the housing and the two aforementioned metals in the layer 15 assume different positions in the electrochemical series.

Figure 2:
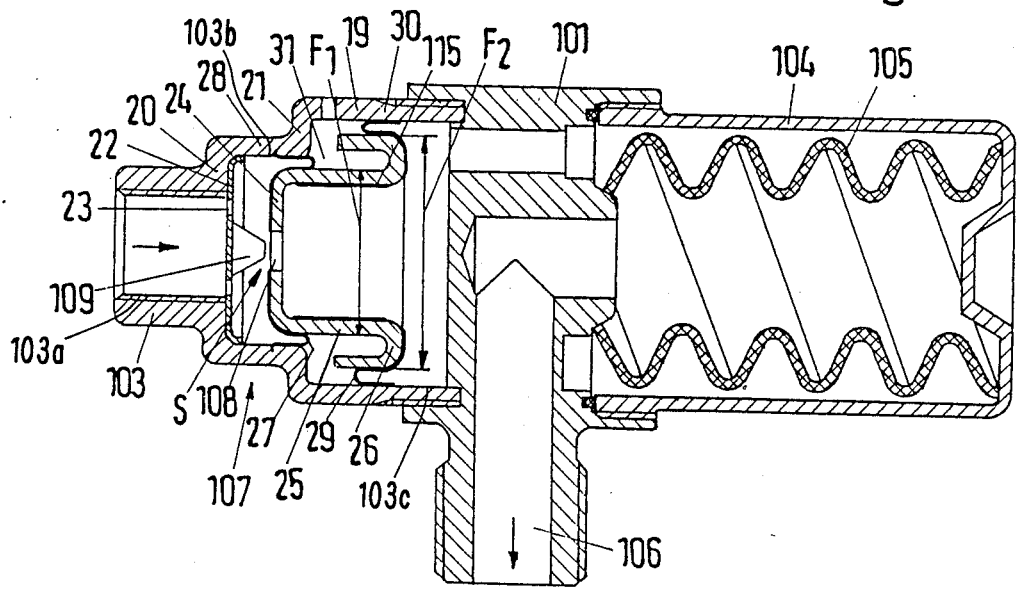
FIG. 2 is a longitudinal section through a second embodiment of the invention.

In the embodiment of FIG. 2, corresponding parts are given reference numerals increased by 100 except for the housing 101. The inlet nipple 103 is provided with a housing 19 having two steps 20, 21. It consists of cylindrical segments, first, second and third bore portions 103a, 103b, 103c respectively with the bore portions being of progressively larger diameters in a downstream direction, and is screwed into the housing 101. A retaining plate 22 with apertures 23 carries a fixed closure member 109 of conical shape. In the housing there is a base plate 24 with an aperture 108. The base plate 24 forms the base of a cup 25 having an outer rim 26 at the open end. A first diaphragm 27 connects the apertured plate 24 to the adjacent housing section 28 of smaller cross-section. A second diaphragm 29 connects the outer rim 26 to the housing section 30 of larger cross-section. Between the diaphragms, there remains a depressurised or evacuated chamber 31 which is relieved to atmosphere. The cup 25 is loaded by the flow over the area $F_1$. The counter-force is produced as a result of the pressure behind the throttle point 107 but acting over the larger area $F_2$. Consequently, conditions of equilibrium are obtained for the cup 25, which define the size of the annular gap S between the closure member 109 and the aperture 108. The dimension of the pressure faces $F_1$ and $F_2$ as well as the shape of the closure member 109 determine the quantity-opening characteristic of the throttle point 107 in such a way that turbulent flow with cavitation is produced behind the throttle point. A galvanically soluble metal layer 115 is provided on the inside of the cup 25.

In this embodiment, cavitation is produced directly in the flow. A cavitation index is obtained which is determined by the ratio of the pressure difference between the inlet pressure and outlet pressure to the pressure difference between the inlet pressure and vapour pressure. The larger this value, the more intensive will be the cavitation. Larger area ratios $F_1:F_2$ therefore lead to stronger cavitation.

In many cases it is not necessary to employ a filter 5, 105 because the calcium carbonate is in the form of a fine sludge that is rinsed through the installation without interference. The form of the closure member 9, 109 could be different from the illustrated examples if other quantity-opening characteristics are desired. In conjunction with the illustrated apparatuses, further measures may be taken to precipitate the calcium carbonate, for example the creation of a magnetic field.

We claim:

1. Apparatus for decalcifing water by producing turbulence, comprising an annular throttle point member having a water flow passage extending therethrough and has an inlet end, the throttle point member having wall means defining a first bore portion and a second bore portion downstream of the first bore portion that forms at least part of the water flow passage, the first bore portion opening to the second bore portion, and first means mounted by said member to extend within said passage to at least in part extend adjacent to the opening of the first bore portion to the second bore portion for creating turbulent flow that causes cavitation downstream thereof independent of the quantity of water flow, said first means including second means movable in an opening direction by the force of the quantity of water flow from the inlet end and subject to a counterforce for varying the effective area of the opening of the first bore portion to the second bore portion, said throttle point member and first means cooperatively forming a variable throttle point, the second means being selected to have the Reynolds number of the turbulent flow larger than 50,000.

2. Apparatus for decalcifing water by producing turbulence as water flows in a downstream direction, comprising a housing having a water passage extending therethrough and an outlet, an inlet nipple mounted by the housing upstream of the housing, the nipple having a central axis and first, second and third bore portions of progressively larger diameters in a downstream direction with the second bore being axially between the first and third bore portions and intersecting therewith, the third bore portion opening to the passage, an apertured fixed member mounted by the nipple adjacent to the intersection of the first and second bore portions and a second member extending axially adjacent to the intersection of the second and third bore portions, one of the second member and the fixed member being a closure member, and means mounted by one of the housing and the nipple for mounting the second member for axial movement relative to the fixed member downstream of the fixed member and opposing the movement of the second member in an opening direction to create turbulence flow causing cavitation independent of the quantity flow of water through the passage.

3. Apparatus according to claim 2, wherein said second member comprises a cup having a transverse base plate that has a first pressure face and a rim portion of a larger diameter than the transverse base plate and that forms a portion of a second pressure face that is downstream of the first pressure face.

4. Apparatus according to claim 2, wherein the second and third bore portions form an annular seat and that the said means includes a spring for resiliently urging the movable member to abut against the seat to block water flow through the seat, the movable member including an upstream portion that diverges in a downstream direction and an annular portion that in cooperation with the third bore portion forms an annular flow space in the passage that extends downstream of the upstream portion 5. Apparatus for decalcifing water by producing turbulence, comprising an annular throttle point member having a water flow passage extending therethrough and has an inlet end, the throttle point member having wall means defining a first bore portion and a second bore portion downstream of the first bore portion that forms at least part of the water flow passage, the first bore portion opening to the second bore portion, and first means mounted by said member to extend within said passage to at least in part extend adjacent to the opening of the first bore portion to the second bore portion for creating turbulent flow that causes cavitation downstream thereof independent of the quantity of water flow, said first means including second means movable in an opening direction by the force of the quantity of water flow from the inlet end and subject to a counterforce for varying the effective area of the opening of the first bore portion to the second bore portion, said throttle point member and first means cooperatively forming a variable throttle point, the second means being selected to have the Reynolds number of the turbulent flow that is substantially constant over the entire operating rage of various quantity flow through the throttle point member.

6. Apparatus for decalcifing water by producing turbulence, comprising an annular throttle point member having a water flow passage extending therethrough and has an inlet end, the throttle point member having wall means defining a first bore portion and a second bore portion downstream of the first bore portion that forms at least part of the water flow passage, the first bore portion opening to the second bore portion, and first means mounted by said member to extend within said passage to at least in part extend adjacent to the opening of the first bore portion to the second bore portion for creating turbulent flow that causes cavitation downstream thereof independent of the quantity of water flow, said first means including second means movable in an opening direction by the force of the quantity of water flow from the inlet end and subject to a counterforce for varying the effective area of the opening of the first bore portion to the second bore portion, said throttle point member and first means cooperatively forming a variable throttle point, the first means comprising a fixed apertured retainer member mounted in the passage upstream of the second means and a spring constantly resiliently urging the second means to block water flow through the passage and provide the counterforce.

7. Apparatus for decalcifing water by producing turbulence, comprising an annular throttle point member having a water flow passage extending therethrough and has an inlet end, the throttle point member having wall means defining a first bore portion and a second bore portion downstream of the first bore portion that forms at least part of the water flow passage, the first bore portion opening to the second bore portion, and first means mounted by said member to extend within said passage to at least in part extend adjacent to the opening of the first bore portion to the second bore portion for creating turbulent flow that causes cavitation downstream thereof independent of the quantity of water flow, said first means including second means movable in an opening direction by the force of the quantity of water flow from the inlet end and subject to a counterforce for varying the effective area of the opening of the first bore portion to the second bore portion, said throttle point member and first means cooperatively forming a variable throttle point, the first means comprising a fixed apertured retainer member mounted in the passage upstream of the second means and the second means having an upstream pressure face and a downstream pressure face that is larger than the upstream pressure face to provide the counterforce.

8. Apparatus for decalcifing water by producing turbulence, comprising an annular throttle point member having a water flow passage extending therethrough and has an inlet end, the throttle point member having wall means defining a first bore portion and a second bore portion downstream of the first bore portion that forms at least part of the water flow passage, the first bore portion opening to the second bore portion, and first means mounted by said member to extend within said passage to at least in part extend adjacent to the opening of the first bore portion to the second bore portion for creating turbulent flow that causes cavitation downstream thereof independent of the quantity of water flow, said first means including second means movable in an opening direction by the force of the quantity of water flow from the inlet end and subject to a counterforce for varying the effective area of the opening of the first bore portion to the second bore portion, said throttle point member and first means cooperatively forming a variable throttle point, the throttle point member having a third bore portion that opens to the second bore portion, is of a larger diameter than the second bore portion and is axially opposite the second bore portion from the first bore portion, the second means including a generally cup shaped member having a base plate axially adjacent to the first means, the base plate having an aperture extending axially therethrough and opening to the first means, a rim portion of a larger diameter than the base plate, located in the third bore portion and located downstream of the base plate from the first means and a cylindrical portion extending axially between the base plate and the rim portion, the cylindrical portion having a radial inner surface, a galvanically soluble metal coating on the radial inner surface, a first diaphragm connected to the cylindrical portion, the wall means defining the third bore portion, and a second diaphragm downstream of the first diaphragm and connected to the cup shaped member and to the wall means defining the third bore portion, the diaphragms, the wall means and the cup shaped member defining a pressure relief chamber and the first means having a closure portion that converges toward the base plate aperture for closing the aperture, the cup shaped member being movable under water pressure away from the closure portion to permit water flow from the inlet end, through the first means and through the base plate aperture into the cup shaped member, and thence downstream thereof.

9. Apparatus for decalcifing water by producing turbulence, comprising an annular throttle point member having a water flow passage extending therethrough and has an inlet end, the throttle point member having wall means defining a first bore portion and a second bore portion downstream of the first bore portion that forms at least part of the water flow passage, the first bore portion opening to the second bore portion, and first means mounted by said member to extend within said passage to at least in part extend adjacent to the opening of the first bore portion to the second bore portion for creating turbulent flow that causes cavitation downstream thereof independent of the quantity of water flow, said first means including second means movable in an opening direction by the force of the quantity of water flow from the inlet end and subject to a counterforce for varying the effective area of the opening of the first bore portion to the second bore portion, said throttle point member and first means cooperatively forming a variable throttle point, the throttle point member including an inlet nipple having the bore portions, a housing mounting the nipple and extending downstream of the nipple and having the passage extending therethrough, and a filter insert attached to the housing for filtering water downstream of the second means.

10. Apparatus for decalcifing water by producing turbulence, comprising an annular throttle point member having a water flow passage extending therethrough and has an inlet end, the throttle point member having wall means defining a first bore portion, a second bore portion downstream of the first bore portion that forms at least part of the water flow passage, and a third bore portion of a larger diameter than the second bore portion, opens to the second bore portion and is axially opposite the second bore portion from the first bore portion, the first bore portion opening to the second bore portion, and first means mounted by said member to extend within said passage to at least in part extend adjacent to the opening of the first bore portion to the second bore portion for creating turbulent flow that causes cavitation downstream thereof independent of the quantity of water flow, said first means including second means movable in an opening direction by the force of the quantity of water flow from the inlet end and subject to a counterforce for varying the effective area of the opening of the first bore portion to the second bore portion, said throttle point member and first means cooperatively forming a variable throttle point, the second and third bore portions intersecting to form an annular seat and the second means comprising a closure member axially movable relative to the seat to provide a variable gap for the water to flow through, the closure member having an upstream portion that converges toward the inlet end and an annular downstream portion that is radially spaced from the third bore portion to in cooperation therewith form an annular clearance space that constitutes a part of the passage, the annular portion being provided with a layer of galvanically soluble metal that is located in the clearance space.

* * * * *